Figure 1:
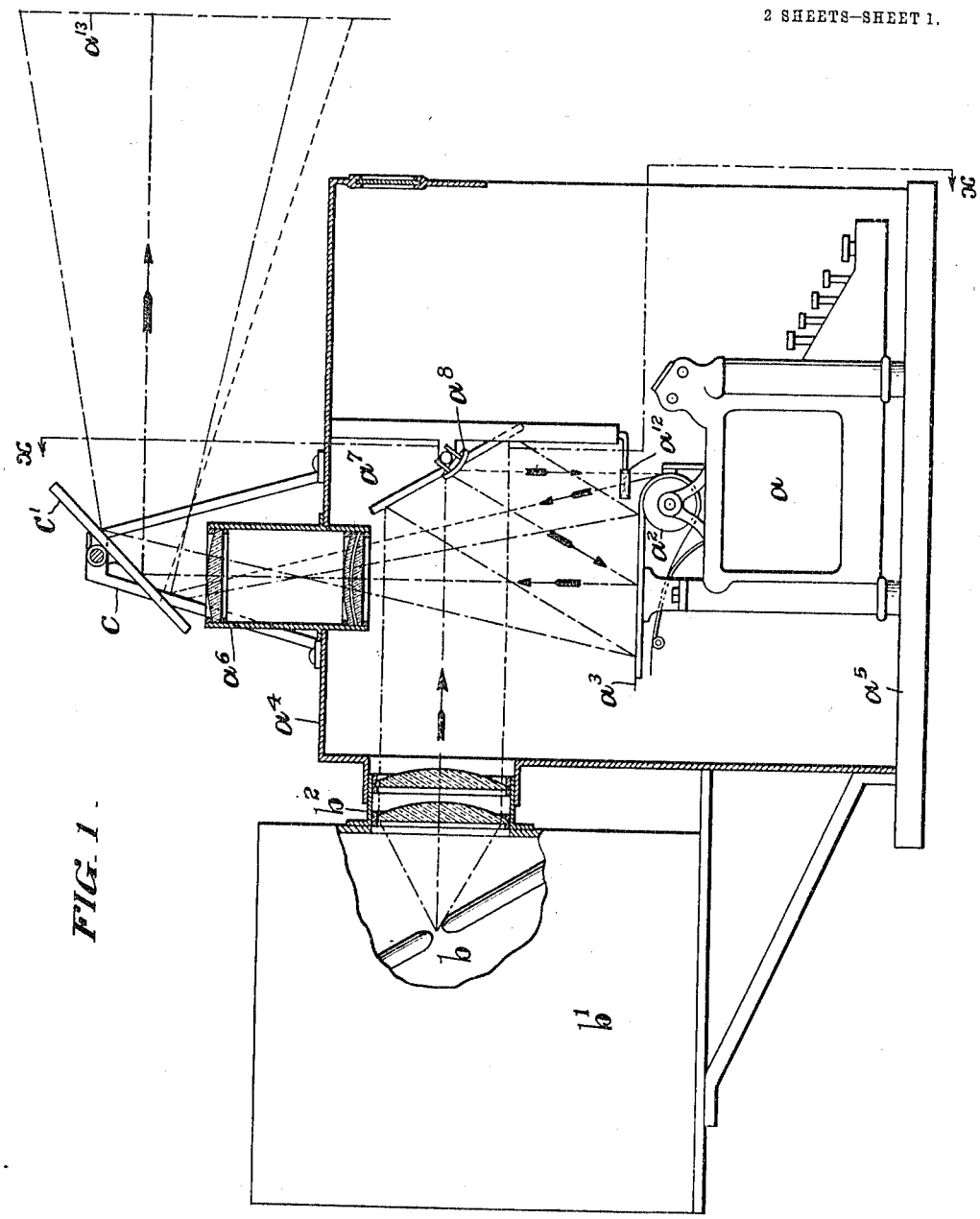

C. C. BALDERSTON.
PROJECTION APPARATUS.
APPLICATION FILED NOV. 4, 1912.
1,081,922.
Patented Dec. 16, 1913.
2 SHEETS—SHEET 2.
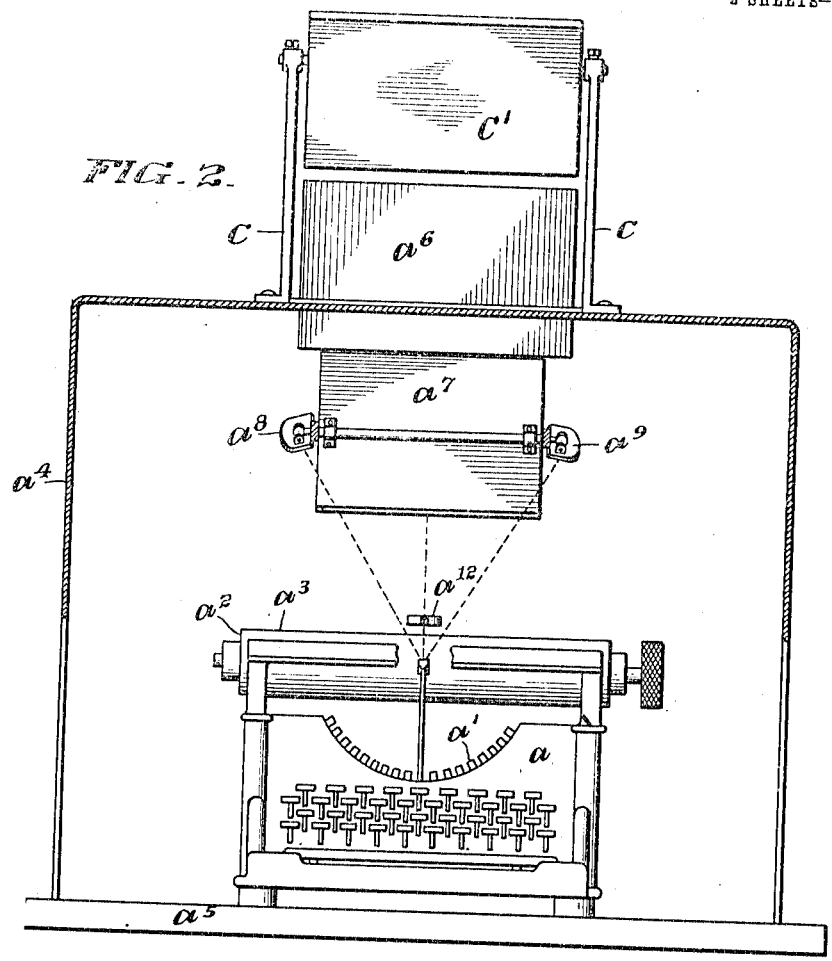
FIG. 2.
FIG. 3.
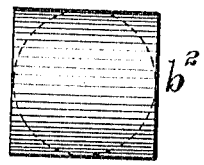
WITNESSES
Thomas M. Smith
Helen F. Miller
INVENTOR
Caleb Canby Balderston,
BY
Walter Douglass.
ATTORNEY

UNITED STATES PATENT OFFICE.

CALEB CANBY BALDERSTON, OF PHILADELPHIA, PENNSYLVANIA, ASSIGNOR TO WILLIAMS, BROWN AND EARLE, INC., OF PHILADELPHIA, PENNSYLVANIA, A CORPORATION OF PENNSYLVANIA.

PROJECTION APPARATUS.

1,081,922.

Specification of Letters Patent. Patented Dec. 16, 1913.

Application filed November 4, 1912. Serial No. 729,256.

*To all whom it may concern:*

Be it known that I, CALEB CANBY BALDERSTON, a citizen of the United States, residing at the city of Philadelphia, in the county of Philadelphia and State of Pennsylvania, have invented certain new and useful Improvements in Projection Apparatus, of which the following is a specification.

My invention has relation to means for presenting the actual operations of a typewriting machine for particularly speed tests, onto a distant screen and employing in the carrying out of the same, an intense light emitting body arranged in the path of condensing lenses with mirrors to illuminate by reflection the matter to be projected onto the distant screen in exemplifying speed tests and the character of work of such machine, ocularly to an audience facing the screen; and to such ends, the invention for its execution, embraces the following instrumentalities, a typewriting machine, a light emitting body in rear of condensing lenses and a mirror in front thereof adjustably arranged so that by reflection, the performed work as well as the action of the type in its performance, are projected through projecting lenses and mirror reflection onto the distant screen to be visible, ocularly to the audience facing the demonstration.

My invention stated in general terms, consists of means designed for speed tests and ocular demonstrations of typewriting on distant screens, comparatively simple in constructive arrangement for the defined purpose; and the same so adjustably arranged as to be readily handled by even the inexperienced.

The nature and scope of my present invention will be more fully understood from the following description taken in connection with the accompanying drawings forming part hereof, in which—

Figure 1, is a view in side elevation and broken section and in central section of parts of an appliance embodying the main features of my said invention. Fig. 2, is a vertical sectional view on the line $x$—$x$ of Fig. 1; and Fig. 3, is a front elevational view of the condensing lenses of the light emitting house.

Referring to the drawings $a$, is a typewriting machine, as shown, of the Underwood type, but it may be of any of the other well-known types of machines, and in which as shown, $a^1$, is the type-bed; $a^2$, the paper carrying roll; and $a^3$, the paper receiving flat horizontal bed located adjacent thereto, all as more clearly illustrated in Fig. 1, of the drawings.

$b$, is a light emitting house located in rear of the machine $a$, in a housing $b^1$, and provided with double condensing lens arranged in a tube $b^2$, with which tube is detachably connected as shown in Fig. 1, the housing or casing $a^4$, encompassing the typewriting machine $a$, and supported on a platform or base $a^5$. The housing $a^4$, carries in the roof a projecting lens-tube $a^6$, and in another part and opposite the condensing lens-tube $b^2$, a mirror $a^7$, with adjustable ears having small mirrors $a^8$ and $a^9$, as clearly illustrated in Fig. 2. $a^{12}$, is an adjustable concave or minus-lens located in the said housing $a^4$, above the position of the type-bars of the machine $a$, for focusing the type-bars on the distant screen, by reflection.

$c$, is a standard supported from the roof of the casing or housing $a^4$, and from the upper end of which is adjustably supported a mirror $c^1$, for reflecting the printed matter produced, and operative actions of the type of the machine $a$, onto the distant screen $a^{13}$, and with such reflections by the instrumentalities defined, indicated by dot and dash deflected lines and directions by arrows as indicated in Fig. 1.

The operation of the apparatus, briefly stated is as follows:—The strong light emitting body $b$, is first established. The condensing lenses $b^2$, and mirror $a^7$, are arranged so as to be in the path of said body, and the side mirrors $a^8$ and $a^9$, then adjusted to insure proper angularity of reflection of the work. The type is then produced and while passing over the bed $a^3$, of the machine, is reflected in a vertical direction through the projecting lens-tube $a^6$, and its mirror $c^1$, onto the distant screen $a^{13}$, and at the same time, the action of the type of the machine in the production of such work will be reflected through the concave or minus-lens $a^{12}$, the projecting lens-tube $a^6$, and its mirror $c^1$, onto the distant screen $a^{13}$, all as will be clearly understood from Fig. 1.

The above described arrangement designed to ocularly demonstrate speed tests as well as the character of work of different typewriting machines on a distant screen, is of such a portable nature as to be readily transportable, and as well the parts or members of such character as to be quickly assembled, for the said defined use.

Having thus described the nature and objects of my invention, what I claim as new and desire to secure by Letters Patent is:—

1. The means of the character described, consisting of a type printing machine with a bed along which travels a type-printed sheet and type located below the plane of said sheet, a light emitting body and a lens arranged to one side of said bed, an adjustable mirror arranged opposite said lens to reflect rays of light from said body onto said printed sheet, a lens arranged above said bed, a mirror arranged above said lens, adjustable in respect thereto, an auxiliary-lens arranged vertically in respect to said type and reflecting mirrors arranged to reflect light onto said type, the combined arrangement being such as that the traveling type-printed sheet work and action of said type are adapted to be projected, for display onto a distant screen.

2. Means of the character described, consisting of a type printing machine located in a house, said machine provided with a bed along which travels a type-printed sheet and type located below the plane of the sheet, a light emitting body and a lens located in another house, but in detachable connection with each other, said body and lens located to one side of said bed, a mirror located opposite said lens to reflect rays of light from said body onto said printed sheet, a projecting lens located above said bed, in said machine-house, a mirror arranged above said lens outside of said house, adjustable in respect to said lens, an auxiliary-lens located in said machine-house above said type and reflecting mirrors located in said machine-house to reflect light onto said type, the combined arrangement being such as that the traveling type printed sheet work and action of said type are adapted to be projected, for display onto a distant screen.

In witness whereof, I have hereunto set my signature in the presence of the two subscribing witnesses hereto.

CALEB CANBY BALDERSTON.

Witnesses:
 THOMAS M. SMITH,
 HELEN F. MILLER.